W. O. KENNINGTON.
IGNITION CONTROLLER.
APPLICATION FILED OCT. 27, 1915.

1,360,758.

Patented Nov. 30, 1920.
3 SHEETS—SHEET 1.

Witnesses
R. B. Mitchell
F. P. McDermott Jr

Inventor
William O. Kennington

UNITED STATES PATENT OFFICE.

WILLIAM O. KENNINGTON, OF DETROIT, MICHIGAN, ASSIGNOR TO REMY ELECTRIC COMPANY, OF ANDERSON, INDIANA.

IGNITION-CONTROLLER.

1,360,758.     Specification of Letters Patent.     Patented Nov. 30, 1920.

Continuation of application Serial No. 949, filed January 7, 1915. This application filed October 27, 1915. Serial No. 58,283.

*To all whom it may concern:*

Be it known that I, WILLIAM O. KENNINGTON, a subject of the King of England, and a resident of Detroit, in the county of Wayne and State of Michigan, have invented a new and useful Ignition-Controller, of which the following is a specification.

My invention relates to ignition controllers for internal combustion engines, which automatically vary the time of ignition by the quantity of mixture which is supplied to the cylinders. The specific purpose of my improvement is to secure slow operation of the engine when it is running with little or no load.

Automatic ignition controllers which adjust the timing of the ignition solely in accordance with the speed of the engine are well known. Such regulation of the ignition timing is, however, imperfect, since for a given engine speed, the ignition should be earlier, the less the quantity of mixture supplied to the cylinders. To overcome this defect in the control of the ignition by speed, various devices have been invented wherein, for a given engine speed, the ignition is earlier, the less the quantity of mixture supplied to the engine. One method of doing this is to advance the ignition timing by the vacuum in the intake pipe of the engine. When the throttle is open, so that a large quantity of mixture is supplied, this vacuum is but slight, and actuates the ignition controller but little, but when the throttle is closed to a considerable extent, the suction of the engine produces a much greater vacuum and actuates the ignition controller to a much greater degree, thereby advancing the ignition to a considerable extent. Instead of using the vacuum in the intake pipe for this purpose, some other difference in pressure which is influenced by the quantity of mixture supplied to the engine may be used, such as the difference in pressure between the exhaust manifold and the external atmosphere.

Still another method is to attach to the throttle controlling mechanism, a connection whereby closing the throttle advances the ignition.

According to the particular requirements of the engine, these devices may be used by themselves or in combination with speed actuated controllers, so that the time of ignition will be determined jointly by the speed of the engine and the amount of mixture supplied thereto.

In practical operation it is frequently necessary to run the engine substantially or entirely without load. This is preferably done at as low speed as possible, to minimize the fuel consumption and wear on the engine. For this purpose the throttle is placed in an almost entirely closed position, which I shall hereinafter term its "no load" position. In addition to this, the ignition should be somewhat retarded, for if it is advanced the engine will not run slowly. It is in this respect that the controllers for advancing the ignition with decrease of mixture are unsatisfactory, since with the throttle in the no-load position, they advance the ignition too much. I employ an arrangement for advancing the ignition as the amount of mixture decreases, which may be one of the already known forms, but add thereto means whereby this arrangement is hindered from advancing the ignition when the throttle is in the no-load position. By "hindered" I mean that the ignition advancing device in question is either partially or wholly prevented from advancing the ignition. According to the peculiarities of the engine, it may be desirable in some cases to entirely prevent this device from advancing the ignition, whereas in other cases it may be desirable to advance it to a certain extent, but not as much as the controller would advance it if no special provision were made to prevent it.

While I have made my invention more particularly with reference to its application to a vacuum actuated advancing device, and here shown and describe it as applied thereto, I do not limit my claims thereto.

Referring to the drawings, which show the preferred form of my invention:

Figure 1:
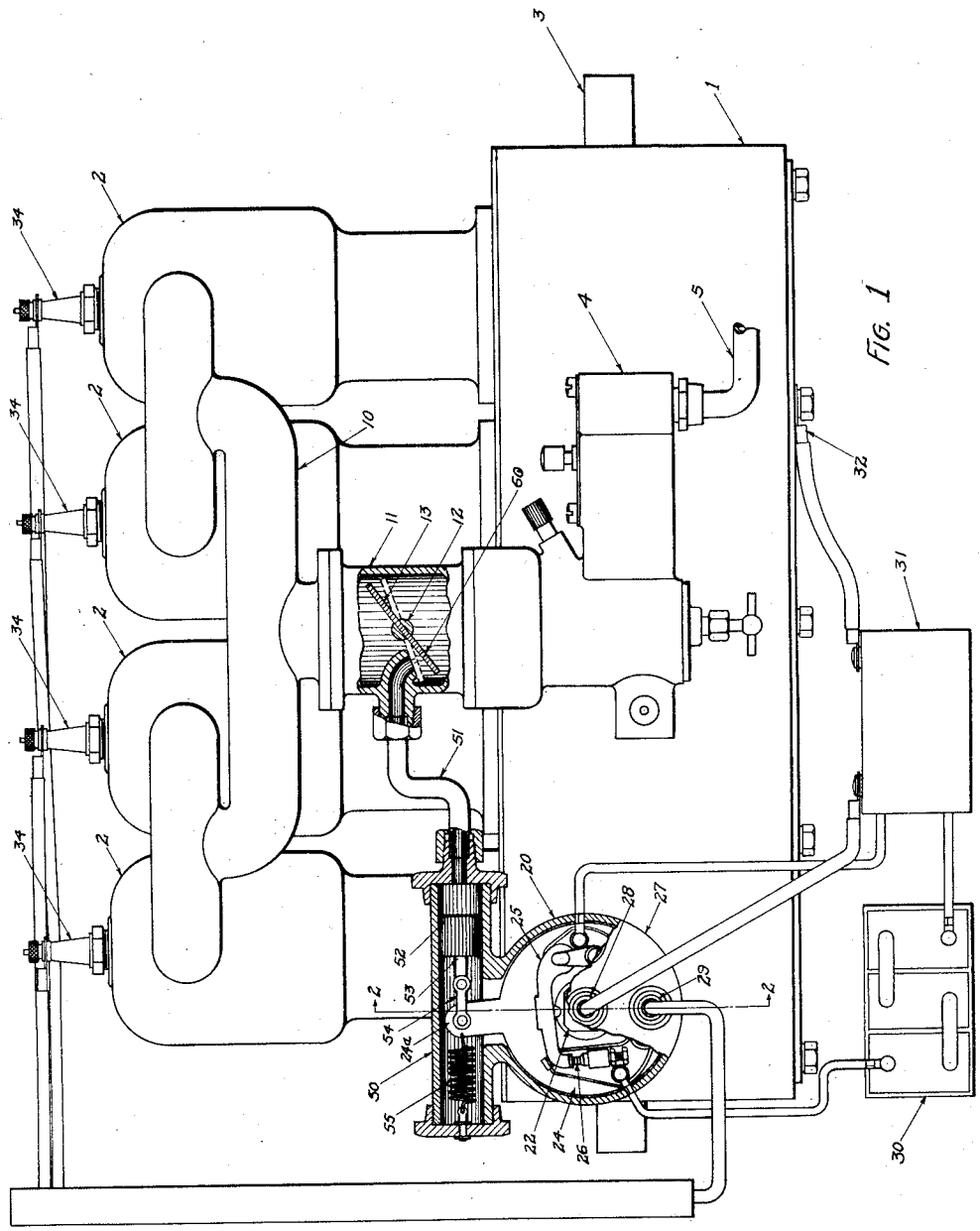
Figure 1 shows an internal combustion engine with my invention applied thereto, certain parts being in section.
Figure 2:
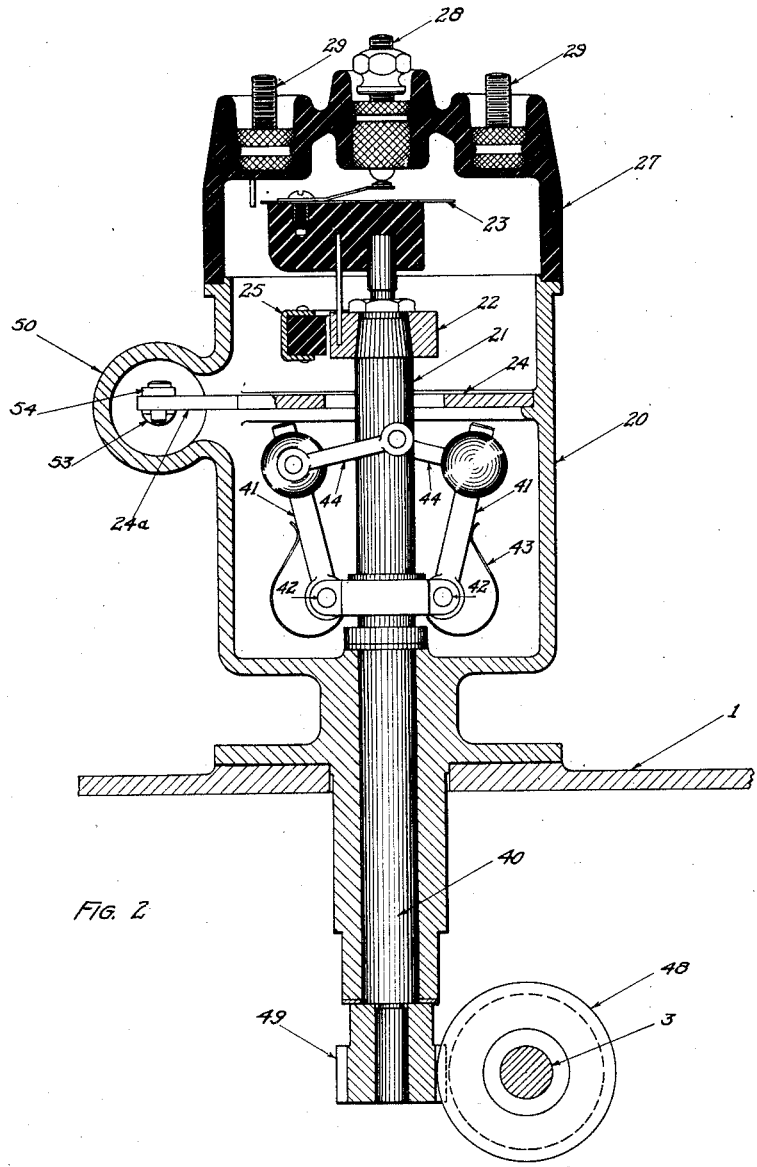
Fig. 2 is a section along the line 2—2 of Fig. 1.

Referring to Fig. 1, 1 is the base of the engine, having cylinders 2, 2, 2, 2, and crankshaft 3. 4 is the carbureter, supplied with gasolene or other fuel through the pipe 5. 10 is the intake manifold. Said intake manifold is connected to the carbureter through the throttle valve, having a casing 11 through which passes a spindle 12 carrying a disk 13. Although the application of my invention is not limited to any specific form of ignition, I show by way of illustration its use in connection with jump spark ignition. Referring to both Figs. 1 and 2, there is a timer having a casing 20 secured to the engine base 1. There is a spindle 21 having rigidly secured thereto a cam 22 and a distributer segment 23. There is a plate 24, which is automatically rotated through a limited range around the spindle 21, when the vacuum in the intake pipe varies, as hereinafter described. Pivoted to said plate is the spring actuated cam lever 25. There is also secured to said plate 24, but insulated therefrom, a contact 26. Rotation of the cam 22 causes the lever 25 to be moved into and out of engagement with the contact 26, in the well known manner. There is a cover, 27, for the timer, preferably of insulating material, with a central terminal 28, and peripheral terminals 29, 29, etc., therein. The distributer segment 23 connects the central terminal 28 with the various terminals 29 successively, in the well known manner. The timer is connected in series with a battery 30 and the primary winding of an induction coil 31, whose secondary winding has one terminal grounded at 32 and the remaining terminal connected to the central distributer terminal 28. The peripheral terminals 29, 29 etc., are connected to the respective spark plugs 34, 34, 34, 34 in the respective cylinders 2, 2, 2, 2.

As previously mentioned, the speed of the engine may if desired, be used to influence the timing of the ignition, and for that purpose I have shown conventionally a device for that purpose. There is a spindle 40, in line with the spindle 21, said spindles 21 and 40 being connected by a centrifugal device whereby rotation of the spindle 40 drives the spindle 21. These spindles rotate synchronously with each other, except that variations in speed change the angular relation between the spindles, so that increasing speed advances the ignition, and vice versa. This centrifugal device is shown as having two weighted arms 41, 41, pivoted to the spindle 40 at the pivots 42, 42. A spring 43 tends to hold these arms in their innermost position. Links 44, 44 connect the arms 41, 41 with the spindle 21, whereby the relative angular position of the spindles is determined by the distance that the arms 41, 41 have moved from their innermost position, and therefore by the speed of rotation. The spindle 40 is driven from the engine in any suitable manner, for example by spiral gears 48, 49, attached respectively to the crankshaft 3 and spindle 40.

There is a cylinder 50 attached to the casing 20, said cylinder being connected by a passage 51 to some portion of the intake pipe, for example, the throttle casing 10. Sliding in this cylinder is a piston 52, connected through a piston rod 53 and link 54 to a projection 24ª of the plate 24. A spring 55 tends to pull the projection 24ª and attached parts to the left. From the above it will be seen that the vacuum in the intake pipe which occurs when the engine is running will move the piston 52 to the right and rotate the plate 24 in a clockwise direction. The relation of the various parts is such that this advances the ignition. When the centrifugal controller is also employed, as here shown, the total amount of advance given to the ignition will be the sum of the advance given by the centrifugal device and that given by the vacuum actuated device.

If only the arrangements so far described were employed, then when the throttle is in the no load position, the high vacuum in the intake pipe would suck the piston 52 far to the right and advance the ignition which is undesirable for reasons given above. To prevent this I so arrange the throttle that when it is in the no-load position, as shown by dotted lines, its disk 13 covers the end of the passage 51, and obstructs the communication between the intake pipe and the cylinder 50. There is, preferably, a certain amount of leakage between interior of the cylinder 50 and the exterior atmosphere, such as might occur, for example, between the piston and the walls of the cylinder. Now, if the fit between the disk 13 and the end of the passage 51 is so tight that communication between the said passage and the interior of the throttle casing is entirely obstructed, the spring 55 will move the piston 52 to its position farthest to the left and retard the ignition.

On some engines it may be preferable to have the spark slightly advanced when the throttle is in the no load position, and yet not advance it as far as would be the case if the communication between the passage 51 and the intake were unobstructed. This result can be obtained by having the communication between the passage 51 and the interior of the throttle chamber but partially obstructed when the throttle is in the no-load position, as might be done, for example, by having an opening 60 in that portion of the disk 13 which abuts the end of the passage 51. The amount of advance obtained when the throttle is in the no load position would be increased by enlarging this opening, and would be decreased by increasing the leakage between the cylinder 50 or passage 51 and the external atmosphere. Whether the throttle entirely obstructs the communication between the passage 51 and the external atmosphere, or does so only partially, it "hinders" in either case the action of the vacuum actuated means for advancing the ignition.

Figure 3:
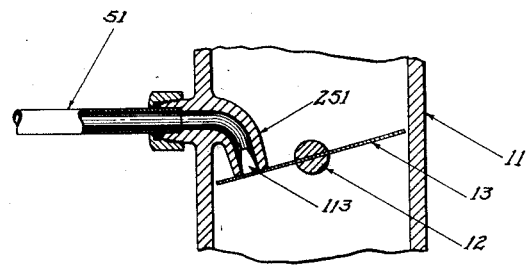
Fig. 3 is a section of a throttle valve to which a modified form is applied.

In some cases it may be desirable to have a considerable range through which the throttle can be moved and still hinder the advance of the ignition. This would be desirable, for example, where the best position of the throttle for no load operation varied with the conditions of the operation of the engine, for example according to whether the engine is hot or cold. To accomplish this, the arrangement shown in Fig. 3 may be used. In this arrangement, the throttle disk 13 is provided with a projection 113, preferably in the form of a circular arc, and when the throttle is within the range of positions in which it may be placed for no load operation, this projection extends into the correspondingly curved end 251 of the tube 51. Whenever this projection is in the tube it hinders the action of the advancing device and, due to the fact that the throttle may move through a certain angle with the tube obstructed by the projection 113, there is a certain range of positions in which the throttle can be placed in which it will hinder the action of the advancing device, and therefore the throttle may be more or less closed for no load running as may be found necessary.

Figure 4:
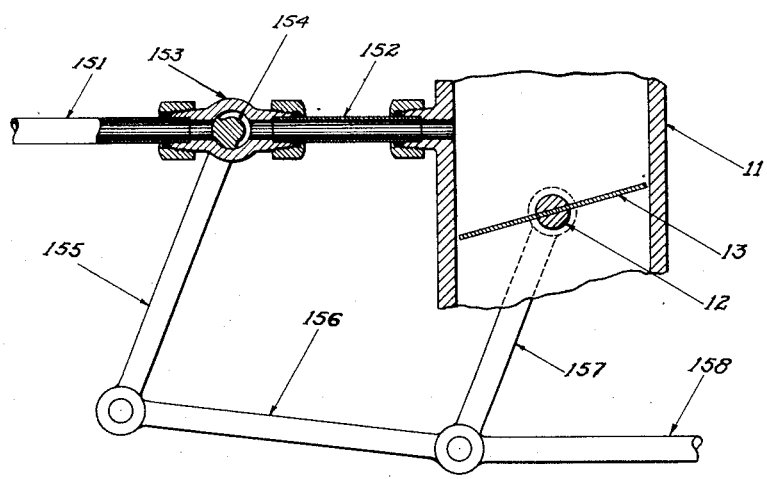
Fig. 4 shows still another modification.

It is not necessary that the obstruction of the passage between the cylinder 50 and the intake pipe 10 be made directly by the throttle disk 13, and at Fig. 4, I have shown another method of accomplishing this. In the tube joining the cylinder 50 with the intake pipe 10, which tube I herein designate by 151 and 152, there is placed a stop cock having a body 153 and a plug 154. There is an arm 155 attached to the stop cock plug which is connected by a link 156 to an arm 157, attached to the throttle spindle 12 and there is shown a rod 158 which may be connected with any suitable device for moving the throttle. The relation between the stopcock, the throttle and the linkages connecting them is so chosen that when the throttle is in the no load position, the passage between the pipes 151 and 152 is partially or entirely obstructed according to the particular requirements of the engine in question.

In the foregoing description, I have shown the preferred form of my invention, but I do not limit myself to this specific form. The invention may be varied within the scope of the claims.

I claim as my invention:

1. The combination with an internal combustion engine and an ignition device for said engine, of a vacuum actuated ignition advancing means associated with said ignition device and the intake pipe of said engine, a throttle valve, and a means for hindering the action of said ignition advancing means when said throttle valve occupies certain positions.

2. The combination with an internal combustion engine and an ignition device for said engine, of a vacuum actuated ignition advancing means associated with said ignition device and the intake pipe of said engine, a throttle valve, and a means for hindering the action of said vacuum actuated ignition advancing means when said throttle valve occupies the no-load position.

3. The combination with an internal combustion engine and an ignition device for said engine, of a vacuum actuated ignition advancing means associated with said ignition device and connected to the intake pipe of said engine, a throttle valve, and a means for obstructing the connection between said ignition advancing means and said intake pipe when said throttle valve occupies certain positions.

4. The combination with an internal combustion engine and an ignition device for said engine, of a vacuum actuated ignition advancing means associated with said ignition device, a passage between said ignition advancing means and the intake pipe of said engine, a throttle valve in said intake pipe, said throttle valve being adapted, when in the no-load position, to cover said passage.

5. The combination with an internal combustion engine and an ignition device for said engine, of an ignition advancing means, actuated by a difference in pressure which varies with the amount of mixture supplied to said engine, a throttle valve, and a means for hindering the action of said ignition advancing means when said throttle valve occupies certain positions.

6. The combination with an internal combustion engine and an ignition device for said engine, of an ignition advancing means actuated by a difference in pressure which varies with the amount of mixture supplied to said engine, a throttle valve, and a means for hindering the action of said ignition advancing means when said throttle valve occupies the no load position.

7. The combination with an internal combustion engine and an ignition device for said engine, of an ignition advancing means whereby reducing the amount of mixture supplied to said engine tends to advance the ignition, a throttle valve, and means dependent upon said throttle valve for hindering the action of said ignition advancing means when said throttle valve occupies certain positions.

8. The combination with an internal combustion engine and an ignition device for said engine, of an ignition advancing means whereby reducing the amount of mixture supplied to said engine tends to advance the ignition, a throttle valve, and means for automatically hindering the action of said ignition advancing means when said throttle valve occupies certain positions.

9. The combination with an internal combustion engine and an ignition device for said engine, of an ignition advancing means whereby reducing the amount of mixture supplied to said engine tends to advance the ignition, a throttle valve, a means for hindering the action of said ignition advancing means when said throttle valve occupies the no load position, and an ignition controlling means dependent on the speed of the engine, whereby the time of ignition is determined jointly by said ignition advancing means and said last named means.

10. The combination with an internal combustion engine and an ignition device therefor, of an ignition advancing means, actuated by a difference in pressure which varies with the amount of mixture supplied to said engine, and means for automatically hindering the action of said ignition advancing means when the engine is running on no load.

11. The combination with an internal combustion engine and an ignition device therefor, of ignition timing means dependent upon the quantity of fuel mixture supplied to said engine, the action of said ignition timing means being automatically hindered when the engine is running on no load.

12. An internal combustion engine having an igniter and means for automatically varying the time of ignition in accordance with the speed of the engine and means for automatically varying the time of ignition by and in accordance with the suction pressure in the carbureter.

13. The combination of a plurality of means for adjusting the timing mechanism of the ignition means of a gasolene engine embracing centrifugally operated means to advance the timing mechanism with increase in speed of the engine, and automatic means co-acting therewith and operating independently thereof to adjust the timing mechanism according to power requirements on the engine.

14. The combination with an engine and its ignition means, of independently operatable automatically operating co-acting mechanisms for adjusting the timing of the ignition means for different speeds of the engine and different power requirements thereon.

15. The combination with an engine and its ignition means, of independently actuatable and automatically operating mechanisms for changing the timing of the ignition means both according to variations in speeds of the engine as well as variations in power requirements thereon, said mechanisms co-acting to operate both differentially and cumulatively to secure proper timing of the ignition means.

16. The combination with an engine and its doubly adjustable ignition means, of speed controlled mechanism for adjusting a portion of said ignition means to vary the timing of the spark, and automatic mechanism operated in accordance with power requirements on the engine to alter the adjustments of another portion of said ignition means to change the timing of the spark, said mechanisms acting both differentially and cumulatively to secure proper timing of the ignition means for all conditions.

17. The combination with an engine and its ignition means, of speed controlled mechanism for varying the timing of said means, and means for also varying the timing of said ignition means according to conditions within the intake manifold of the engine.

18. In a device of the class described, the combination with a gasolene engine, its ignition means and intake manifold, of speed controlled devices for varying the timing of said ignition means according to different speeds of the engine, and means connected with the manifold of the engine and susceptible to variations of flow and pressure therein and connected to said ignition means co-acting with said speed controlling devices to secure proper adjustment of the ignition means both for different power requirements and different speeds of the engine.

19. In a device of the class described, the combination with an engine, an adjustable auxiliary mechanism for said engine, a fuel inlet and throttle valve controlling the flow through said inlet, of means communicating with said inlet at a point between the throttle valve and the inlet ports of the engine cylinders, said means susceptible to changes of conditions of flow and pressure within the manifold and caused to operate thereby to adjust said auxiliary mechanism.

20. The combination with an internal-combination engine having a throttle and an ignition timer for said engine, of means controlled by the suction of said engine for adjusting said timer, and a device operated by the engine throttle for modifying the operation of said suction device.

21. The combination with an internal-combustion engine having a throttle and an ignition timer for said engine, of means for adjusting said timer and a device operated by the engine throttle for modifying the operation of said timer adjusting means whereby to time the ignition most advantageously for engine idling conditions.

22. The combination with an internal-combustion engine and an ignition timer for said engine, of means for adjusting the ignition timer in accordance with load and speed operating conditions of the engine, and a device operated by the engine throttle for modifying the operation of said timer adjusting means.

23. The combination with an internal-combustion engine and an ignition timer for said engine, of means for adjusting the timer in accordance with load and speed operating conditions of the engine, and manually operable means for modifying the action of said timer adjusting means whereby to time the ignition most advantageously for engine idling conditions.

24. The combination with an internal-combustion engine and an ignition timer for the engine, of means controlled by the suction of the engine for adjusting said timer, and manually operable means for modifying the action of said timer adjusting means whereby to time the ignition most advantageously for engine idling conditions.

25. The combination with an internal-combustion engine having a throttle and an ignition timer for the engine, of means controlled by the vacuum produced in the engine intake for adjusting said timer, and means for shutting off the vacuum when the engine throttle is in position for engine idling.

26. The combination with an internal-combustion engine having a throttle and an ignition timer for the engine, of means controlled by the vacuum produced in the engine intake for adjusting said timer, and means for modifying the action of said timer control means in accordance with the movement of said throttle.

27. The combination with an internal-combustion engine having a throttle and an ignition timer for the engine, of means for adjusting the timer in accordance with load and speed operating conditions of the engine, and means for modifying the action of said timer control means in accordance with the movement of said throttle.

28. In an ignition controller, the combination with an engine having an intake conduit and a throttle valve; of an ignition timer; a suction actuated setting device therefor; a conduit connecting the suction device and the intake conduit; and a manually operable valve in said conduit, said valve being adapted to progressively vary the degree of effective suction upon the suction device and to cut off the suction when the engine is idling.

29. In an ignition controller, the combination with an engine having an intake conduit and a throttle valve; of an ignition timer; a suction actuated setting device therefor; means providing a passage between the suction setting device and the intake conduit; and means controlled by the movement of the throttle for cutting off the suction in the passage.

Signed at Detroit, county of Wayne, State of Michigan, Oct. 23, 1915.

WILLIAM O. KENNINGTON.

Witnesses:
FRANKLIN P. McDERMOTT, Jr.,
Z. V. PATTERSON.